(12) United States Patent  
Lin et al.

(10) Patent No.: US 10,395,379 B2
(45) Date of Patent: Aug. 27, 2019

(54) IMAGE OBJECT TRACKING METHOD AND APPARATUS

(71) Applicant: Institute For Information Industry, Taipei (TW)

(72) Inventors: Ching-Wen Lin, New Taipei (TW); Kai-Pin Tung, Taipei (TW)

(73) Assignee: Institute For Information Industry, Taipei (TW)

( * ) Notice: Subject to any disclaimer, the term of this patent is extended or adjusted under 35 U.S.C. 154(b) by 81 days.

(21) Appl. No.: 15/835,450

(22) Filed: Dec. 7, 2017

(65) Prior Publication Data

US 2019/0156494 A1 May 23, 2019

(30) Foreign Application Priority Data

Nov. 23, 2017 (TW) .............................. 106140751 A

(51) Int. Cl.
```
G06T 7/00      (2017.01)
G06T 7/246     (2017.01)
G06T 7/60      (2017.01)
G01P 15/02     (2013.01)
G06T 7/73      (2017.01)
G06F 3/00      (2006.01)
```
(52) U.S. Cl.
CPC .............. *G06T 7/248* (2017.01); *G01P 15/02* (2013.01); *G06T 7/60* (2013.01); *G06T 7/74* (2017.01); *G06T 2207/10016* (2013.01)

(58) Field of Classification Search
CPC .................................... G06F 3/00; G06T 7/00
USPC ......................................................... 382/103
See application file for complete search history.

(56) References Cited

U.S. PATENT DOCUMENTS

| 9,303,999 B2 * | 4/2016 | Hesch ................. G01C 21/165 |
| 2010/0135527 A1 | 6/2010 | Wu et al. |
| 2017/0018092 A1 | 1/2017 | Lee et al. |

\* cited by examiner

*Primary Examiner* — Abolfazl Tabatabai
(74) *Attorney, Agent, or Firm* — Skaar Ulbrich Macari, P.A.

(57) ABSTRACT

An image object tracking method and apparatus are provided. The image object tracking method includes the steps of: determining a feature point of a target object in a first frame, determining a prediction point of the feature point in a second frame, calculating an estimated rotation angle of an image capturing device according to a distance between the coordinate of the prediction point and the coordinate of the feature point and a distance between the image capturing device and the target object, calculating a lens rotation angle of the image capturing device rotated from a time point that the first frame is captured to a time point that the second frame is captured according to a piece of inertial measurement information provided by an inertial measurement unit, and determining whether the prediction point corresponds to the feature point by comparing the estimated rotation angle and the lens rotation angle.

14 Claims, 6 Drawing Sheets

IMAGE OBJECT TRACKING METHOD AND APPARATUS

PRIORITY

This application claims priority to Taiwan Patent Application 106140751 filed on Nov. 23, 2017, which is hereby incorporated by reference in its entirety.

FIELD

The present invention relates to a method and an apparatus for tracking an image object. Specifically, the present invention relates to a method and an apparatus for tracking an image object wither reference to a piece of inertial measurement information.

BACKGROUND

The object recognition and tracking of images has been widely used in the field of security surveillance and robot vision. The main operation mode of the recognition and tracking is to determine the object of interest from the image captured by the image capturing device and to continuously track the object.

The technique of tracking the image object can be divided into two major categories, namely the feature point recognition method and the optical flow method. The feature point recognition method is obtaining the feature points of interest in the object of each frame of the image, and then extracting the local features of the surrounding local regions for each feature point, and finally selecting the feature points for feature matching, the successful feature matching point is the recognized feature point. The Optical flow method is to find the spatial correspondence of the feature points between the previous frame and the current frame according to the pixel's temporal variation in the image sequence and the correlation between adjacent frames.

However, there still exists many problems difficult to be solved in the conventional image object tracking technology. For example, when there are some objects with similar appearance (for example, many buttons or vehicles of the same type and the like) in the vicinity of the target object the image, the number of valid feature points captured may be insufficient to determine the target object. As another example, when the environmental brightness is insufficient or the image capturing device is moving too rapid to cause blurred images, or the target object disappears in the image area for a short time, the tracking may be interrupted, the tracking may be interrupted and the determining error is occurred.

Accordingly, an improved accurate and effective image-target tracking technique to solve the above-mentioned problems of the prior art is required.

SUMMARY

The disclosure includes an image object tracking method and apparatus to assist the identification of feature points of a target object by a piece of inertial measurement information and thereby improve the efficiency and accuracy of object tracking.

The disclosure includes an image object tracking method, which is executed by a processor. The image object tracking method can include the folio steps: (a) determining a specific feature point of a target object in a first frame by a feature point extraction algorithm, wherein the first frame is captured by an image capturing device; (b) determining at least one prediction point in a second frame for the specific feature point by an optical flow method, wherein the second frame is captured by the image capturing device, and the at least one prediction point forms a prediction point set; (c) calculating an estimated rotation angle of the image capturing device according to a first distance and a second distance, wherein first distance is the distance between a first coordinate position of a specific prediction point in the prediction point set and a second coordinate position of the specific feature point, and the second distance the distance between the image capturing device and the target object; (d) calculating a lens rotation angle of the image capturing device rotated from a first time point that the first frame is captured to a second time point that the second frame is captured according to a piece of inertial measurement information provided by an inertial measurement unit used with the image capturing apparatus; (e) determining that an absolute value of a difference value between the lens rotation angle and the estimated rotation angle is less than a threshold; and (f) determining the specific prediction point corresponds to the specific feature point based on the determination result of the step (e).

The disclosure also includes an image object tracking apparatus. The image object tracking apparatus can comprise an image capturing device, an inertial measurement unit and a processor, wherein the processor is electrically connected to the image capturing device and the inertial measurement unit. The image capturing device captures an image sequence, wherein the image sequence comprises a first frame and a second frame. The inertial measurement unit generates a piece of inertial measurement information, wherein the piece of inertial measurement information is derived from a first time point that the image capturing device captures the first frame to a second time point that the image capturing device captures the second frame. The processor executes the following steps: (a) determining a specific feature point of a target object in the first frame by a feature point extraction algorithm; (b) determining at least one prediction point in the second frame by an optical flow method, wherein the at least one prediction point forms a prediction point set; (c) calculating an estimated rotation angle of the image capturing device according to a first distance and a second distance, wherein the first distance is the distance between a first coordinate position of a specific prediction point in the prediction point set and a second coordinate position of the specific feature point, and the second distance is the distance between the image capturing device and the target object; (d) calculating a lens rotation angle of the image capturing device rotated from a first time point that the first frame is captured to a second time point that the second frame is captured according to a piece of inertial measurement information; (e) determining that an absolute value of a difference value between the lens rotation angle and the estimated rotation angle is less than a threshold; and (f) determining that the specific prediction point corresponds to the specific feature point based on the determination result that the estimated rotation angle is less than the threshold.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications, or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction, and dimensions of elements and dimensional relationships among individual elements in the attached drawings are only for the purpose of illustration, but not to limit the scope of the present invention.

Figure 1:
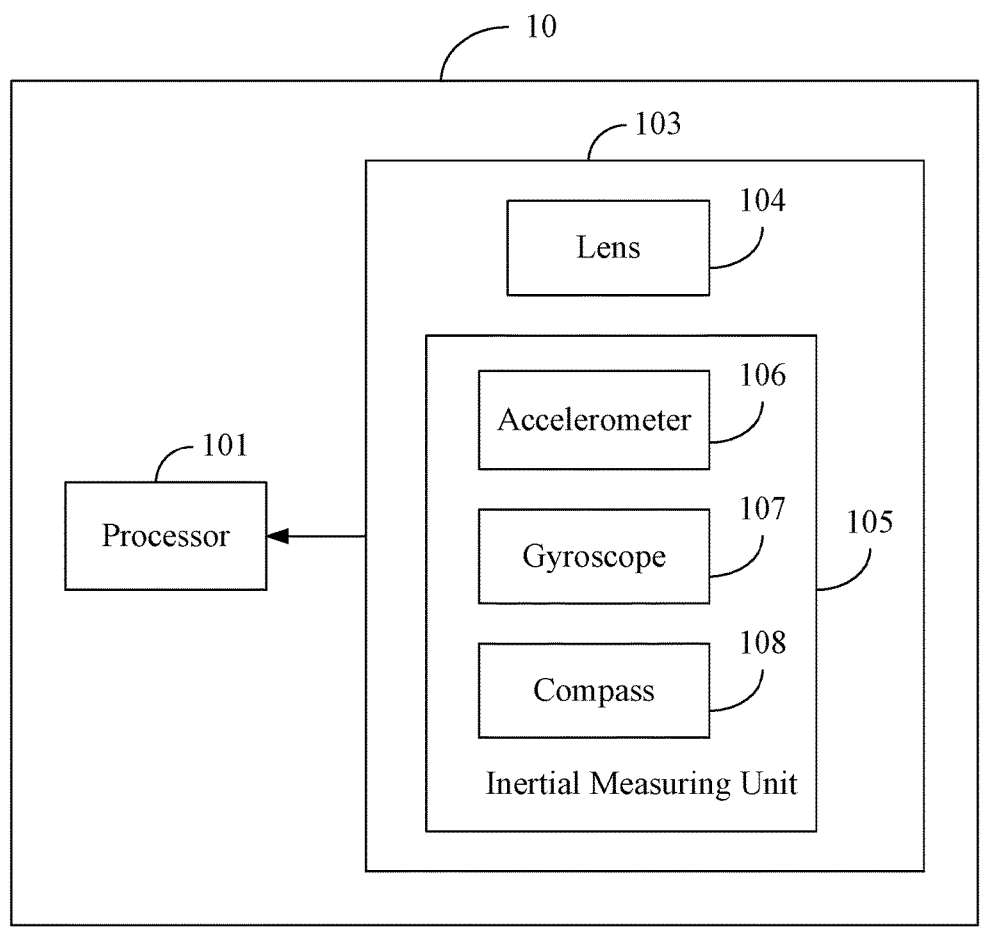
FIG. 1 is a schematic view of the configuration of an image object tracking apparatus according to the present invention.
Figure 2:
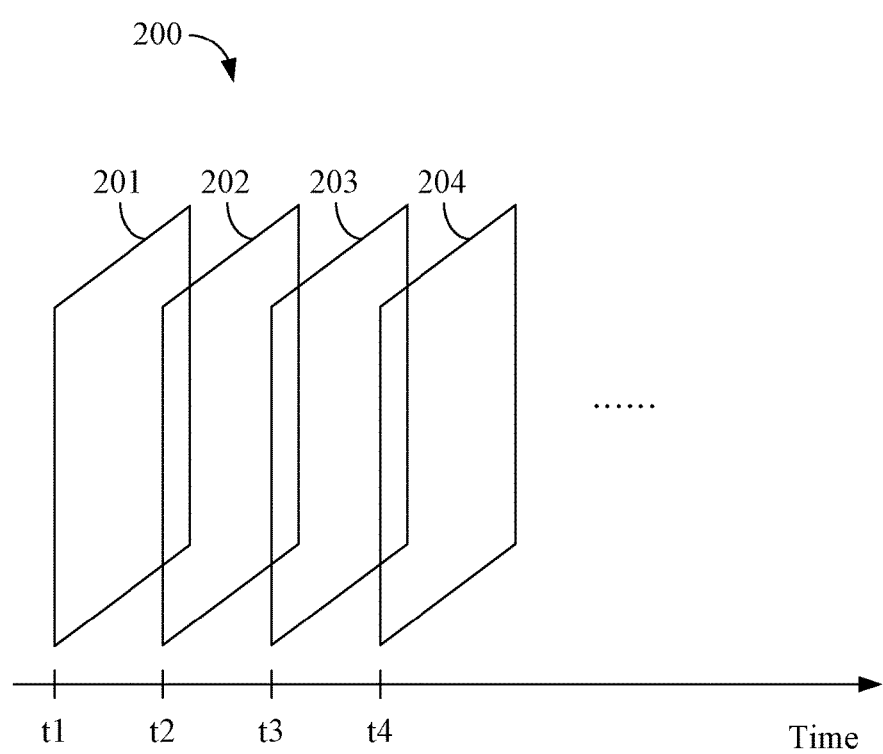
FIG. 2 is a schematic view of the image sequence captured by the image capturing device of the present invention.
Figure 3:
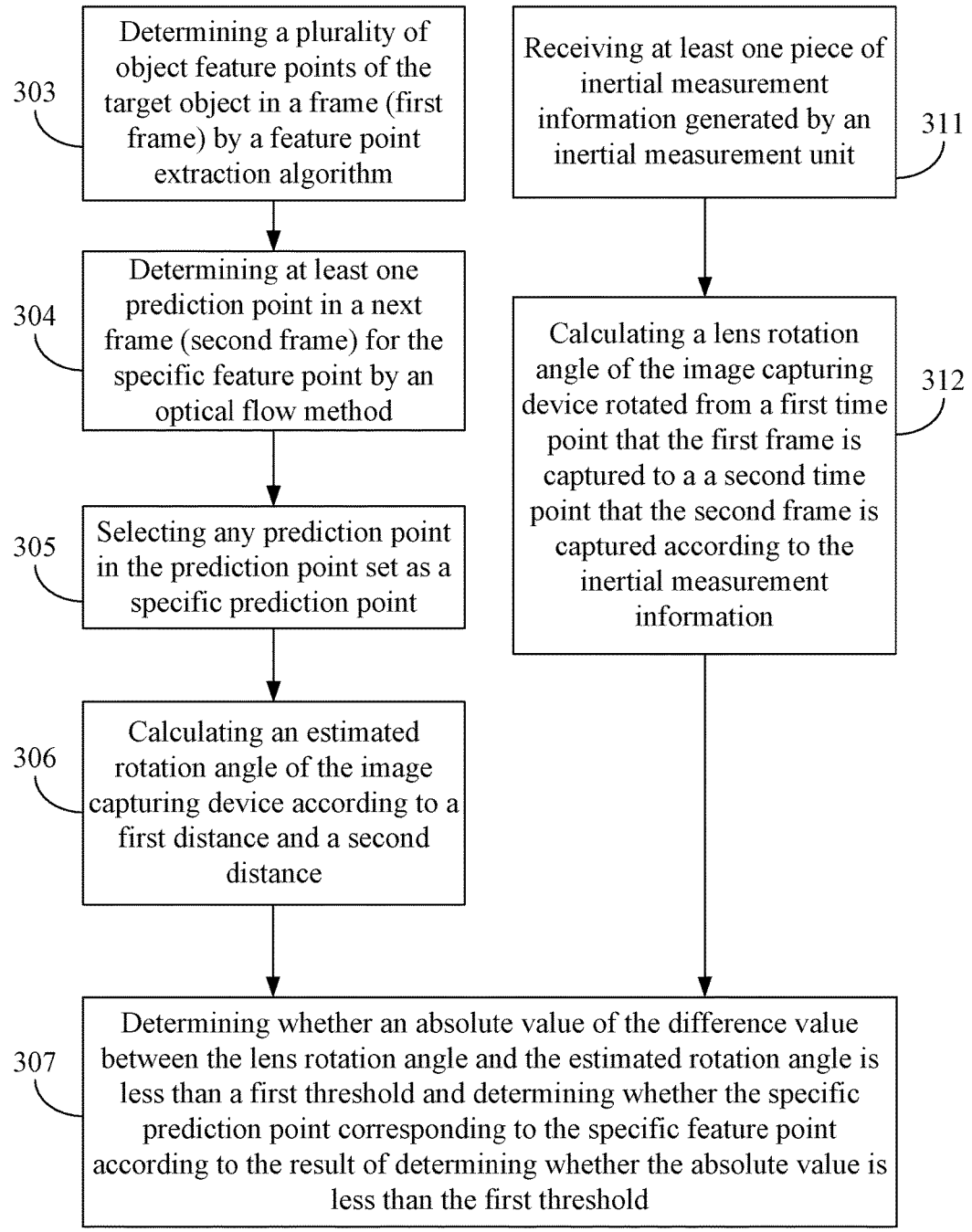
FIG. 3 is a flowchart of the image object tracking method executed by a first embodiment of the present ion.

The first embodiment of the present invention is shown in FIGS. 1-3. FIG. 1 is a schematic diagram of an embodiment of an image object tracking apparatus 10 according the presentation. The image object tracking apparatus 10 includes a processor 101 and an image capturing device 103, wherein the processor 101 is electrically connected to the image capturing device 103. The image capturing device 103 includes a lens 104 and an inertial measuring unit 105. The image capturing device 103 may be a camera, a monitor, or other devices capable of capturing image sequences. The inertial measurement unit 105 may include at least one of an accelerometer 106, a gyroscope 107, and a compass 108. Although the processor 101 is disposed outside the image capturing device 103 in the embodiments shown in FIG. 1, the processor may be disposed in the image capturing device in other embodiment(s). In addition, in other embodiments, the image object tracking apparatus of the present invention may be configured to include a processor, an image capturing device, and an inertial measuring unit, and the processor is electrically connected to the image capturing device and the inertial measurement unit.

Please refer to FIG. 2 and FIG. 3, wherein FIG. 2 is a schematic diagram of an image sequence 200 captured by the image capturing device 103 and FIG. 3 is a flowchart of an image object tracking method according to the present invention. In this embodiment, the image capturing device 103 captures the image sequence 200. Specifically, the image capturing device 103 respectively captures the frames 201, 202, 203, 204 of the image sequence 200 at time points t1, t2, t3, t4. In the process of capturing the frames 201, 202, 203, 204 by the image capturing device 103, the inertial measurement unit 105 operates continuously to generate a plurality pieces of inertial measurement information.

In this embodiment, the image object tracking apparatus 10 and the image object tracking method executed by the image object tracking apparatus 10 determine a target object to be tracked (for example, the processor 101 determines a target object in the frame 201 according to a user command, determines an object that meets a specific condition as a target object by an object detection technology). Afterwards, at the step 303, the processor 101 determines a plurality of object feature points of the target object in the frame 201 by a feature point extraction algorithm. Afterwards, the image object tracking device 10 and the image object tracking method performed thereof track each object feature point. For better understanding of the embodiment, in the following description, one of the object feature points will be taken as an example to describe how the image object tracking apparatus 10 and the image object tracking method performed thereof track that specific feature point in the subsequent frames 202, 203, 204.

Then, proceeding to the step 304, the processor 101 determines at least one prediction point in the frame 202 (that is, the next frame of the frame 201) for the specific feature point in the frame 201 by using the optical flow method, and the at least one prediction point forms a prediction point set. Thereafter, the step 305 is performed to select any prediction point in the prediction point set as a specific prediction point. Then, proceeding to the step 306, the processor 101 calculates an estimated rotational angle of the image capturing device 103 according to a first distance and a second distance, wherein the first distance is the distance between a coordinate position of the specific prediction point in the frame 202 and a coordinate position of the specific feature point in the frame 201 and the second distance is the distance between the image capturing device 103 and the target object. It should be noted that if the specific prediction point is indeed the feature point corresponding to the specific feature point in the frame 202, the first distance can be understood as the distance that the specific feature point moves from the time point t1 to the time point t2. Therefore, the estimated rotational angle of the image capturing device 103 in the time interval from the time point t1 to the time point t2 can be estimated according to the first distance and the second distance.

As described above, during the process of capturing the frames 201, 202, 203, 204 by the image capturing device 103, the inertial measurement unit 105 operates continuously to generate a plurality of pieces of inertial measurement information. In other words, the inertial measurement unit 105 generates at least one piece of inertial measurement information between time point t1 and time point t2. During the process of the steps 303 to 306, the image object tracking apparatus 10 and the image object tracking method performed may perform the steps 311 and 312 to calculate the actual lens rotation angle of the image capturing device 103 rotated form the time point t1 to the time point t2. Specifically, at the step 311, the processor 101 receives at least one piece of inertial measurement information generated by the inertia measurement unit 105 between the time point t1 and the time point t2. Then, proceeding to step 312, the processor 101 calculates a lens rotation angle of the image capturing device 201 rotated from the time point t1 that the frame 201 is captured to the time point t2 that the frame 202 is captured according to the at least one piece of inertial measurement information.

Then, proceeding to the step 307, the processor 101 determines whether an absolute value of a difference value between the lens rotation angle and the estimated rotation angle is less than a first threshold. If the absolute value of the difference value is less than the first threshold, the specific prediction point on the frame 202 is determined to correspond to the specific feature point on the frame 201. If the absolute value of the difference value is not less than the first threshold, the specific prediction point on the frame 202 does not correspond to the specific feature point on the frame 201. If the specific prediction point on the frame 202 does not correspond to the specific feature point in the frame 201, the processor 101 may perform the step 305 again to select another prediction point that has not been selected as a new specific prediction point from the prediction point set, then repeat the steps 306 and 307.

It should be noted that, in some embodiments, the image object tracking apparatus 10 and the image object tracking method may analyze the relationship between the specific feature point on the frame 201 and each of the prediction points included in the prediction point set. That is, the steps 305, 306, and 307 are repeated until all the prediction points included in the prediction point set have been analyzed. In these embodiments, if several prediction points have the characteristic that the absolute value of the difference value between the estimated rotation angle and the lens rotation angle is less than the first threshold, the processor 101 may select the prediction point with the smallest absolute value of the difference value as a feature point corresponding to the specific feature point.

As described above, there are a plurality of object feature points of the target object in the frame 201. The image object tracking apparatus 10 and the image object tracking method performed may repeat the steps 304-307, 311, and 312 to determine the feature points in the frame 202 that respectively correspond to the object feature points in the frame 201. Afterwards, the processor 101 determines the position of the target object in the frame 202 according to the determined feature points in the frame 202.

The image object tracking apparatus 10 and the image object tracking method performed may repeat the foregoing operations and track the target object in the subsequent frames 203, 204, ..., and so on. How the image object tracking apparatus 10 and the image object tracking method performed track the target object in the subsequent frames 203, 204, ..., and so on based on the foregoing description can be readily understood by those of ordinary skill in the art.

It should be noted that the feature point extraction algorithm used in the step 303 may be a well known SIFT (scale-invariant feature transform) algorithm, a SURF (speeded up robust features) algorithm, an ORB (Oriented. FAST and Rotated BRIEF) algorithms, FAST (Features from Accelerated Segment Test) algorithms, or BRISK (Binary Robust Invariant Scalable Keypoints) algorithms. However, the present invention is not limited thereto. In some embodiments, the method of correcting feature points by piece of inertial measurement information can be well matched with the BRISK algorithm, so that the tracking of the image object performs more fast and accurate.

It should be noted that each piece of inertial measurement information provided by the inertial measurement unit 105 may include a piece of acceleration information, a piece of direction angle information and/or a piece of angular acceleration information, wherein the piece of acceleration information is provided by the accelerometer 106, the piece of direction angle information is provided by the compass 108, and the piece of angular acceleration information is provided by the gyroscope 107. The lens rotation angle calculated in the step 312 may be provided separately from the angular acceleration information or calculated from the acceleration information and the direction angle information. In detail, the rotation angle can be quickly obtained by performing numerical integration twice on the angular acceleration information provided by the gyroscope. By this approach, the computational burden of the processor 101 is lower, and the accuracy is lower. In the other way, if the processor 101 estimates the rotation angle based on the piece of acceleration information and the piece of direction angle information, a more accurate rotation angle may be obtained. The two kinds of calculation methods can be adopted together or used to correct one from the other.

Figure 4:
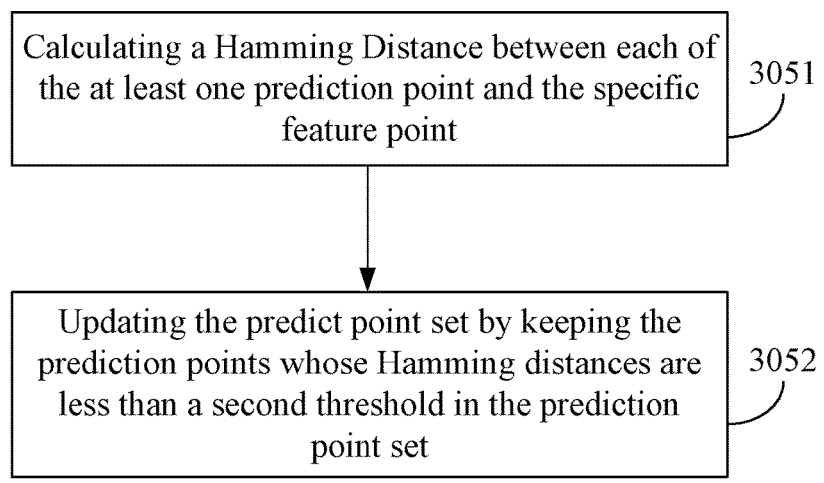
FIG. 4 is a flowchart of the additional procedure in the second embodiment the present invention.

For the second embodiment of the present invention, please refer to FIGS. 1 to 4, wherein FIG. 4 illustrates the steps additionally performed by the second embodiment. The image object tracking apparatus 10 and the image object tracking method of the second embodiment can perform the operations described in the first embodiment, have the same functions, and achieve the same effect. Therefore, only the difference between the two embodiments will be detailed described in the following.

In this embodiment, after performing the step 304, the processor 101 proceeds to the step 3051, where the processor 101 calculates a Hamming Distance between each of the prediction points in the prediction point set and one of the specific feature points. Afterwards, the step 3052 is executed by the processor 101 to update the prediction point set. Specifically, the processor 101 keeps the prediction points whose Hamming distances are less than a second threshold in the prediction point set. In other words, the processor 101 the prediction points whose Hamming distance is not less than the second threshold from the prediction point set. The processor 101 then executes the step 305 and its subsequent steps. In other words, in this embodiment, the step 305 executed by the processor 101 select the specific prediction point from the updated prediction point set.

The Hamming distance is derived by comparing the digitized numerical value of the color, lightness, and/or contrast of two point (that is, the aforementioned specific feature point and any specific prediction point) in the image frame, and even by comparing the digitized numerical value of the color, lightness, and/or contrast of the adjacent areas of the two points. How to calculate the Hamming distance between two points in a frame should be well known by those ordinary skill in the art, so it is not described here. In this embodiment, the Hamming distance is used to determine the similarity between the specific feature point and each of the prediction points in the prediction point set so that only the prediction points closer to the specific feature point are retained in the prediction point set. As a result, the computational burden of matching the feature points and the prediction points can be reduced, and the target object tracking in the image sequence can be accelerated.

Figure 5:
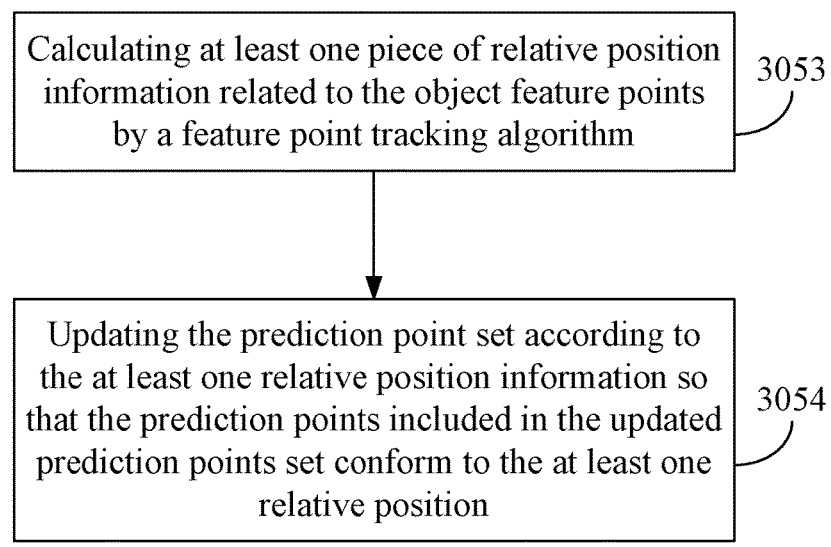
FIG. 5 is a flowchart of the additional procedure in of the third embodiment of the present invention.

For the third embodiment of the present invention, please refer to FIGS. 1 to 3 and FIG. 5, wherein FIG. 5 is a schematic diagram illustrating the steps extra performed by the third embodiment. The image object tracking apparatus 10 and the image object tracking method of the third embodiment can also perform the operations described in the first embodiment and have the corresponding functions, and achieve the corresponding effect. Therefore, only the difference between the two embodiments will be detailed described in the following.

In this embodiment, the processor 101 performs the step 3053 after the step 304, in which the processor 101 calculates at least one piece of relative position information related to the object feature points determined in the step 303 via a feature point tracking algorithm (for example, a CMT tracking algorithm (i.e. Clustering of Static-Adaptive Correspondences for Deformable Object Tracking)). For example, at the step 3053, a center of gravity of the object feature points may be calculated, a distance between each object feature point and the center of gravity is calculated, and the distances are considered as aforesaid at least one piece of relative position information. Afterwards, proceeding to step 3054, the processor 101 updates the prediction point set according to the at least one piece of relative position information so that the prediction points included in the updated prediction points set conform to the at least one relative position. The processor 101 then executes the step 305 and its subsequent steps. In other words, in this embodiment, the 305 performed by the processor 101 selects the specific speculation point from the updated prediction point set.

Preferably, some embodiments may integrate all the operations of the aforementioned first, second, and third embodiments. For example, the steps 3053 and 3054 may be performed after the steps 3051 and 3052 (that is, the prediction point set is updated via the Hamming distances and then further updated via the feature point tracking algorithm). Take another example, the steps 3051 and 3052 may be performed after the steps 3053 and 3054 (that is, the prediction point set is updated via the feature point tracking algorithm and then further updated via the Hamming distances). In this way, the specific prediction point may be selected from a smaller prediction point set whose prediction points are more similar, and then the matching procedure by using inertial measurement information described in the first embodiment is executed. Thus, the computational burden can be further reduced for the following matching procedure of feature points and the prediction points. In addition, the overall speed of tracking the target object in the image can be further increased.

Figure 6:
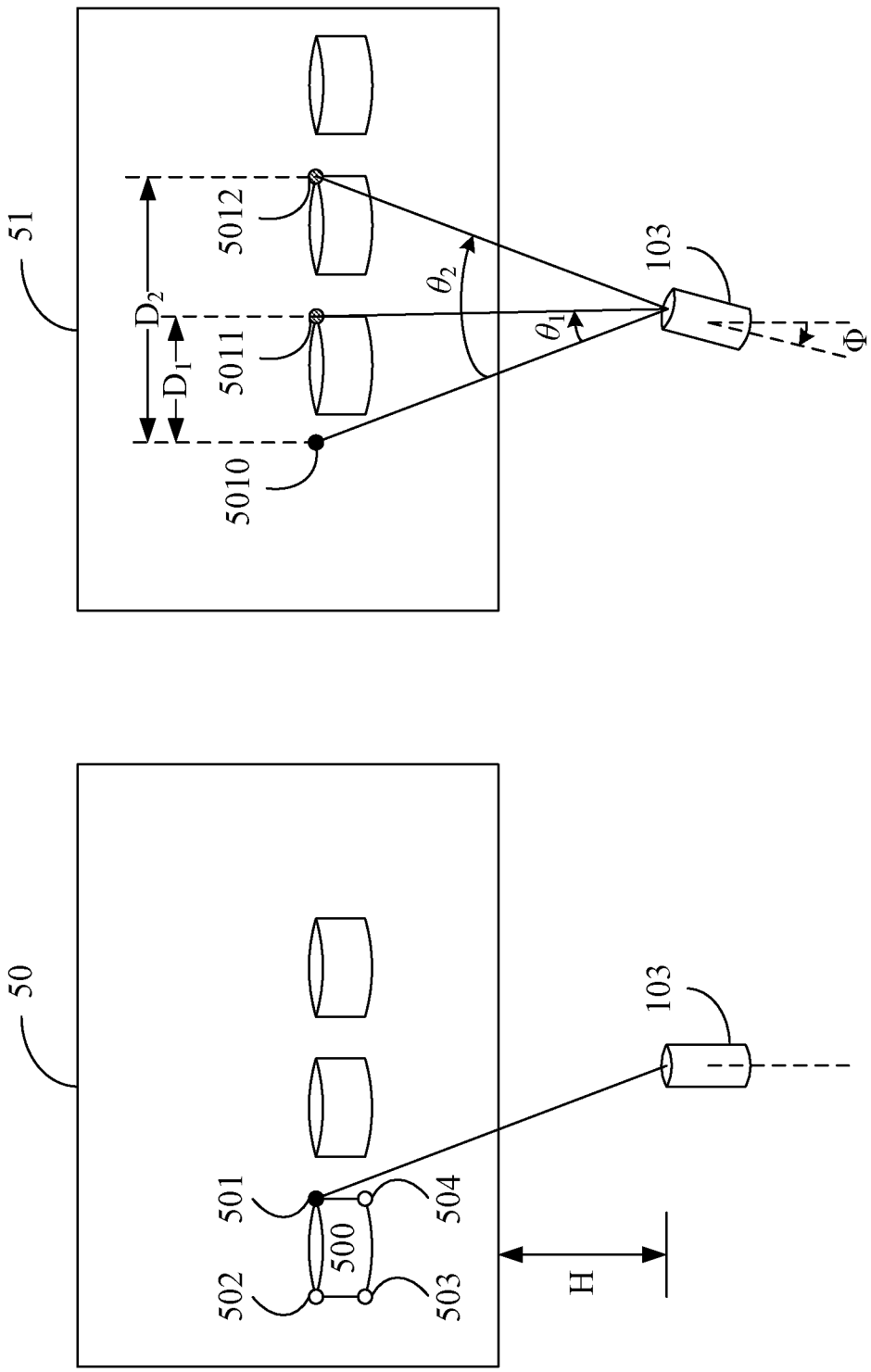
FIG. 6 is a schematic diagram of an embodiment of calculating an estimated rotation angle according to the present invention.

Please refer to FIG. 6, which is a schematic diagram illustrating one embodiment of the present invention for calculating an estimated rotation angle. In this embodiment, an image sequence includes a first frame 50 and a second frame 51 which comes after the first frame 50 with respect to time. The first frame 50 has a target object 500 to be tracked. In this example, the target object 500 is a button image on the dashboard. In this embodiment, a plurality of object feature points 501-504 of the target object 500 are determined by a feature point extraction algorithm. In this embodiment, the object feature points 501 to 504 are separately processed. However, the object feature point 501 is taken as an example to further illustrate how to calculate the estimated rotation angle in the following description.

Specifically, when the object feature point 501 is selected as a specific feature point, the plurality of prediction points 5011 and 5012 in the second frame 51 are determined for the object feature point 501 by the optical flow method in the present embodiment. In FIG. 6, the coordinate position of the point 5014) in the second frame 51 is the coordinate position of the object feature point 501 in the first frame 50. The distance between the coordinate position of the prediction point 5011 and the coordinate position of the point 5010 (that is, the coordinate position of the object feature point 501) is the distance D1. The distance between the coordinate position of the prediction point 5012 and the coordinate position of the point 5010 (that is, the coordinate position of the object feature 501) is the distance D2. In the present embodiment, based on the distance $D_1$ and the distance H from the image capturing device 103 to the target object 500, a first estimated rotation angle $\theta_1$ of the image capturing device 103 rotated from the first time point that the first frame 50 is captured to the second time point that the second frame 51 is captured is calculated by using the inverse trigonometric function $\tan^{-1}$. Similarly, a second estimated rotation angle $\theta_2$ of the image capturing device 103 rotated from the first time point that the first frame 50 is captured to the second time point that the second frame 51 is captured is calculated based on the distance D2 and the distance H. On the other hand, the lens rotation angle Φ of the inertial measurement unit is calculated according to the inertial measurement information obtained from the first time point that the first frame 50 is captured to the second time point that the second frame 51 is captured. Finally, in the present embodiment, the estimated rotation angle $\theta_1$ and the estimated rotation angle $\theta_2$ are individually compared with the lens rotation angle Φ. Specifically, in this embodiment, the absolute value of the difference value between the estimated rotation angle $\theta_1$ and the lens rotation angle Φ is calculated, and the absolute value of the difference value between the estimated rotation angle $\theta_2$ and be lens rotation angle Φ is calculated. Then, the prediction point with the absolute value of the difference value less than a first threshold, or the prediction point with the smaller absolute values of the difference value, is selected as the real position of the object feature point 501 in the second frame 51.

As an example of FIG. 6, if the absolute value of the difference value between the estimated rotation angle $\theta_1$ and the lens rotation angle Φ is less than the first threshold value and the absolute value of the difference value between the estimated rotation angle $\theta_2$ and the lens rotation angle Φ is greater than the first threshold, the prediction point 5011 corresponding to the estimated rotation angle $\theta_1$ is determined to correspond to the object feature point 501 (i.e., the coordinate position of the prediction point 5011 is the real position of the object feature point 501 in the second frame 51).

Thereafter, in the present embodiment, the real position of the other object feature points 502-504 of the target object 500 in the second frame 51 are obtained by repeating the foregoing operation, and then the real position of the target object in the second frame 51 is determined thereby.

It should be noted that the distance H between the image capturing device 103 and the target object 500 may be preset as a predetermined value according to the application occasion, or may be measured by a distance measuring device (not shown) mounted on the image capturing device 103, and so on. For example, the distance measuring element may be a laser device or a microwave radar device or the like.

In some embodiments, the image capturing device 103 may be disposed on a smart wearable device (such as a smart glasses or a smart helmet) or on a smart handheld device (for example, a mobile phone).

Another practical application of the present invention is illustrated as following. The image capturing device 103 is mounted on a smart helmet worn by a user. In a dashboard operating environment, the image capturing device 103 may transmit the image sequence captured by the image capturing device 103 to a remote headquarters through a network. The expert remotely instructs the user to operate on the tracked target object based on the content of the image sequence. In this case, the distance H between the image capturing device 103 and the target object 500 can be preset to be 30-50 cm according to the manual operation distance of the user. Since the dashboard usually includes a plurality buttons with similar colors and appearances, the present invention can track the target button more accurately and avoid identification error.

According to the technology of the present invention, when object(s) with a similar appearance exists in the vicinity of the target object, the relative moving information (such as angle, displacement, etc.) of the image capturing device 103 with respect to the target object in the frame can be obtained y the inertial measurement unit 105 used with the image capturing device 103, thereby the target object identification and tracking can be achieved more accurately. When the image capturing device 103 moves a large amount to cause the target object to move out of the image frame temporarily, the relative moving information of the image capturing device 103 relative to the target object in the image can be used to avoid the recognition error and/or the result of interrupted tracking. If the number of valid object feature points in the frame is insufficient due to the blurring of the captured image, more feature point matching conditions may be provided by the inertial measurement information with the image capturing device 103 to reduce identification error.

To sum up, the method and the apparatus for image object tracking of the present invention can improve the accuracy of the object tracking and the tracking efficiency, and solve the problems of the prior art and have great industrial value.

The above embodiments are only used to exemplify some embodiments of the present invention, but are not intended to limit the scope of the present invention. People skilled in the art to which the present invention pertains can make various changes and modifications without departing from the spirit and scope of the present invention. Therefore, the protection scope of the present invention should be defined by the appended claims.

What is claimed is:

1. An image object tracking method being executed by a processor, comprising:
    (a) determining a specific feature point of a target object in a first frame by a feature point extraction algorithm, wherein the first frame is captured by an image capturing device;
    (b) determining at least one prediction point in a second frame for the specific feature point by an optical flow method, wherein the second frame is captured by the image capturing device, and the at least one prediction point forms a prediction point set;
    (c) calculating an estimated rotation angle of the image capturing device according to a first distance and a second distance, wherein the first distance is the distance between a first coordinate position of a specific prediction point in the prediction point set and a second coordinate position of the specific feature point, and the second distance is the distance between the image capturing device and the target object;
    (d) calculating a lens rotation angle of the image capturing device rotated from a first time point that the first frame is captured to a second time point that the second frame is captured according to a piece of inertial measurement information provided by an inertial measurement unit used with the image capturing apparatus;
    (e) determining that an absolute value of a difference value between the lens rotation angle and the estimated rotation angle is less than a first threshold; and
    (f) determining that the specific prediction point corresponds to the specific feature point based on the determination result of the step (e).

2. The image object tracking method of claim 1, wherein the feature point extraction algorithm is a BRISK (Binary Robust Invariant Scalable Keypoints) algorithm.

3. The image object tracking method of claim 1, further comprising:
    (g) calculating a Hamming Distance between each of the at least one prediction point and the specific feature point; and
    (h) updating the prediction point set according to the at least one Hamming Distance so that the Hamming distance of each of the at least one prediction point included in the updated prediction point set is less than a second threshold, wherein the specific prediction point is selected from the updated prediction point set in the step (c).

4. The image object tracking method of claim 1, wherein a plurality of object feature points of the target object is determined in the step (a), the specific feature point is one of the object feature points, and the image object tracking method further comprising:
    (g) calculating at least one piece of relative position information related to the object feature points by a feature point tracking algorithm; and
    (h) updating the prediction point set according to the at least one piece of relative position information so that the at least one prediction point of the updated prediction point set conforms to the at least one piece of relative position information;
    wherein the specific prediction point is selected from the updated prediction point set in the step (c).

5. The image object tracking method of claim 1, wherein the piece of inertial measurement information comprises at least one of a piece of acceleration information, a piece of direction angle information, and a piece of angular acceleration information.

6. The image object tracking method of claim 5, wherein the lens rotation angle is calculated according to the piece of acceleration information and the piece of direction angle information in the step (d).

7. The image object tracking method of claim 1, wherein the image capturing device is disposed in one of a smart wearable device and a smart handheld device.

8. An image object tracking apparatus comprising:
    an image capturing device for capturing an image sequence, wherein the image sequence comprises a first frame and a second frame;
    an inertial measurement unit for generating a piece of inertial measurement information,
        wherein the piece of inertial measurement information is derived from a first time point that the image capturing device captures the first frame to a second time point that the image capturing device captures the second frame; and
    a processor electrically connected to the image capturing device and the inertial measurement unit, and configured to execute the following steps:
        determine a specific feature point of a target object in the first frame by a feature point extraction algorithm;
        determine at least one prediction point in the second frame for the specific feature point by an optical flow method, wherein the at least one prediction point forms a prediction point set;
        calculate an estimated rotation angle of the image capturing device according to a first distance and a second distance, wherein the first distance is the distance between a first coordinate position of a specific prediction point in the prediction point set and a second coordinate position of the specific feature point, and the second distance is the distance between the image capturing device and the target object;
        calculate a lens rotation angle of the image capturing device rotated from a first time point that the first frame is captured to a second time point that the second frame is captured according to the piece of inertial measurement information;

determine that an absolute value of a difference value between the lens rotation angle and the estimated rotation angle is less than a first threshold; and determine that the specific prediction point corresponds to the specific feature point based on the determination result that the absolute value of the difference value is less than the first threshold.

9. The image object tracking apparatus of claim 8, wherein the feature point extraction algorithm is a BRISK (Binary Robust Invariant Scalable Keypoints) algorithm.

10. The image object tracking apparatus of claim 8, wherein the processor further calculates a Hamming Distance between each of the at least one prediction point and the specific feature point, and updates the prediction point set according to the at least one Hamming distance so that the Hamming distance of each of the at least one prediction point included in the updated prediction point set is less than a second threshold, wherein the specific prediction point is selected from the updated prediction point set by the processor.

11. The image object tracking apparatus of claim 8, wherein the processor determines a plurality of object feature points of the target object by the feature point extraction algorithm, the specific feature point is one of the object feature points, the processor further calculates at least one piece of relative position information related to the object feature points by a feature point tracking algorithm, and the processor further updates the prediction point set according to the at least one relative position information so that the at least one prediction point of the updated prediction point set conforms to the at least on relative position, wherein the specific prediction point is selected from the updated prediction point set by the processor.

12. The image object tracking apparatus of claim 8, wherein the piece of inertial measurement information comprises at least one of a piece of acceleration information, a piece of direction angle information, and a piece of angular acceleration information.

13. The image object tracking apparatus of claim 12, wherein the processor calculates the lens rotation angle according to the piece of acceleration information and the piece of direction angle information.

14. The image object tracking apparatus of claim 8, wherein the image capturing device is disposed in one of a smart wearable device and a smart handheld device.

* * * * *